(12) United States Patent
Cho et al.

(10) Patent No.: US 8,733,645 B2
(45) Date of Patent: May 27, 2014

(54) UNIFIED TRANSPORTATION PAYMENT SYSTEM

(75) Inventors: Juik Cho, Seoul (KR); Yunyeop Lee, Seoul (KR)

(73) Assignee: LG CNS Co., Ltd., Seoul (KR)

( * ) Notice: Subject to any disclaimer, the term of this patent is extended or adjusted under 35 U.S.C. 154(b) by 0 days.

(21) Appl. No.: 13/283,872

(22) Filed: Oct. 28, 2011

(65) Prior Publication Data
US 2013/0105576 A1  May 2, 2013

(51) Int. Cl.
*G07B 15/02* (2006.01)
(52) U.S. Cl.
USPC ............ 235/384; 235/375; 235/380; 235/492
(58) Field of Classification Search
USPC .................. 235/384, 380, 375, 487, 492, 451; 705/75, 53, 64–65
See application file for complete search history.

(56) References Cited

U.S. PATENT DOCUMENTS

| | | | |
|---|---|---|---|
| 5,973,619 A | 10/1999 | Paredes | |
| 6,718,319 B1 | 4/2004 | Fisher, Jr. et al. | |
| 6,792,337 B2 | 9/2004 | Blackett et al. | |
| 7,240,846 B2 * | 7/2007 | Arisawa et al. | 235/492 |
| 7,356,018 B2 | 4/2008 | Seyama et al. | |
| 7,460,482 B2 | 12/2008 | Pike | |
| 7,513,423 B2 * | 4/2009 | Kocznar et al. | 235/382 |
| 7,529,241 B2 | 5/2009 | Milligan et al. | |
| 7,694,051 B2 | 4/2010 | Wei | |
| 7,731,086 B2 * | 6/2010 | Saunders et al. | 235/382 |
| 7,957,402 B2 | 6/2011 | Konduru et al. | |
| 2002/0158122 A1 * | 10/2002 | Fisher, Jr. | 235/375 |
| 2002/0170962 A1 * | 11/2002 | Besling et al. | 235/384 |
| 2004/0054595 A1 | 3/2004 | Din | |
| 2005/0165683 A1 | 7/2005 | Taylor | |
| 2006/0251046 A1 | 11/2006 | Fujiwara et al. | |
| 2007/0118474 A1 * | 5/2007 | Tushie et al. | 705/41 |
| 2007/0205279 A1 * | 9/2007 | Bistany | 235/384 |
| 2008/0142585 A1 | 6/2008 | Foreman et al. | |
| 2009/0210299 A1 * | 8/2009 | Cowen | 705/13 |
| 2010/0153279 A1 | 6/2010 | Zahn | |

FOREIGN PATENT DOCUMENTS

| | | |
|---|---|---|
| KR | 10-2010-0131858 A | 12/2010 |
| KR | 10-2011-0031046 A | 3/2011 |

OTHER PUBLICATIONS

"SUB-20 Multi Interface USB Adapter USB-I2C, USB-SPI, USB-GPIO, RS232, RS485, MDIO, Ir, LCD, PWM", Dimax Micro Connection to the Macro Vision, http://www/xdimax.com/sub20/sub201html, 5 pages. no Author.
EPO, International Search Report, Application No. 12184715.6-1958, Dated Apr. 22, 2013, 7 pages.
Further Examination Report dated Sep. 17, 2013, 3 pages.

* cited by examiner

*Primary Examiner* — Edwyn Labaze
(74) *Attorney, Agent, or Firm* — Darrell L. Pogue; Keohane & D'Alessandro, PLLC

(57) ABSTRACT

Embodiments of the present invention relate to an electronic payment system and more particularly to a unified transportation payment system. In one embodiment, a passenger uses a card which has been set up for use within the transportation system to pay transportation costs. The card contains data including information representing a monetary value. The passenger uses the card at a card reader located at the transportation center. The card reader includes an application programming interface (API) which receives the data read from the card including information representing the monetary value stored on the card. The monetary value is adjusted by assessing an amount corresponding to a value associated with the transaction.

22 Claims, 4 Drawing Sheets

UNIFIED TRANSPORTATION PAYMENT SYSTEM

TECHNICAL FIELD

In general, embodiments of the present invention relate to an electronic payment system and more particularly to a unified transportation payment system.

BACKGROUND

Today, public transportation consists of a variety of modes including buses, trolleys, subways, trains, and ferries. In the United States, public transportation is a large part of the solution to the nation's economic, energy, and environmental challenges. People are using public transportation in increasing numbers. Public transportation saves fuel, reduces traffic congestion, and also helps individuals save money. Public transportation also benefits the environment. One person switching to public transit can reduce daily carbon emissions by twenty pounds.

Along with the various modes of transportation, there exists a variety of payment methods for the transportation fare. Accepted payment methods for public transportation may include tickets, tokens, cash, credit cards, debit cards, etc. Automated systems have attempted to make the payment process simpler and more efficient. Automated fare collection (AFC) system is the name given to automated transportation ticketing systems. Typically, AFC systems are connected to the information systems in vehicles, at stations or other transportation centers.

However, there is no standard format governing the different AFC systems. The tickets used by one system are likely to be different than the tickets of another system at a different location. Also, a city or region may have a different ticket for each different mode of transportation. Heretofore, several unsuccessful attempts have been made to address these shortcomings.

U.S. Pat. No. 5,973,619 discloses an automated vehicle dispatch and payment honoring system distributed to serve numerous locations and users.

U.S. Patent Application 20050165683 discloses a universal payment debit card for transportation vehicles for hire.

U.S. Patent Application 20040054595 discloses an electronic payment system used in public transportation vehicles which utilizes both the smart card and the credit card.

U.S. Patent Application 20100153279 discloses systems and methods for global transportation, vetting, and payment for ridesharing and use of public transport.

U.S. Patent Application 20080142585 discloses a system and method that employs a rewritable radio frequency identification device (RFID), or smart card technology, such as an electronic wallet to which charges can be debited and credited.

None of these references, however, teach a unified system which can read different types of cards in payment processing.

SUMMARY

In general, embodiments of the present invention provide a unified transportation payment system. A passenger uses a card which has been set up for use within the transportation system to pay transportation costs. The card contains data including information representing a monetary value. The passenger uses the card at a card reader located at the transportation center. The card reader includes an application programming interface (API) which receives the data read from the card including information representing the monetary value stored on the card. The monetary value is adjusted by assessing an amount corresponding to a value associated with the transaction. The API determines a classification type of the card based on the data read from the card and maps the card data including the adjusted monetary value in accordance to a predefined format structure based on the classification. The mapped card data is then written to the card including the adjusted monetary value.

A first aspect of the present invention provides a transportation payment system, the system comprising: a card for storing data including information representing a monetary value; and an accepting device having a card reader, wherein the accepting device includes a card reader, wherein the accepting device includes at least one computer in operative connection with the card reader, wherein the at least one computer is configured to access a card reader interface application, wherein the card reader interface application is configured to control operation of the card reader to carry out a transaction.

A second aspect of the present invention provides a method for processing a payment transaction in a transportation system, comprising: storing data including information representing a monetary value on a card; reading card data stored on the card including information representing the monetary value stored on the card; adjusting the monetary value by assessing an amount corresponding to a value associated with the transaction; determining a classification type of the card based on the data read from the card; mapping the card data including the adjusted monetary value in accordance to a predefined format structure based on the classification; and writing the mapped card data to the card.

A third aspect of the present invention provides method for deploying a transportation payment system, comprising: providing a card for storing data including information representing a monetary value; and providing an accepting device having a card reader, wherein the accepting device includes a card reader, wherein the accepting device includes at least one computer in operative connection with the card reader, wherein the at least one computer is configured to access a card reader interface application, wherein the card reader interface application is configured to control operation of the card reader to carry out a transaction, wherein the card reader interface application is configured to cause the card reader to read card data stored on the card including information representing the monetary value stored on the card, adjust the monetary value by assessing an amount corresponding to a value associated with the transaction, determine a classification type of the card based on the data read from the card, map the card data including the adjusted monetary value in accordance to a predefined format structure based on the classification, wherein the at least one computer is configured to receive the mapped card data and write the mapped card data to the card.

A fourth aspect of the present invention provides a computer program product for processing a payment transaction in a transportation system, the computer program product comprising a non-transitory computer readable storage medium, and program instructions stored on the non-transitory computer readable storage medium, to: store data including information representing a monetary value on a card; read card data stored on the card including information representing the monetary value stored on the card; determine a format classification based on a format of the card data; and generate mapped data by decoding the card data based on the format classification, wherein the mapped data is recognizable by the card reader.

BRIEF DESCRIPTION OF THE DRAWINGS

These and other features of this invention will be more readily understood from the following detailed description of the various aspects of the invention taken in conjunction with the accompanying drawings in which.

Figure 1:
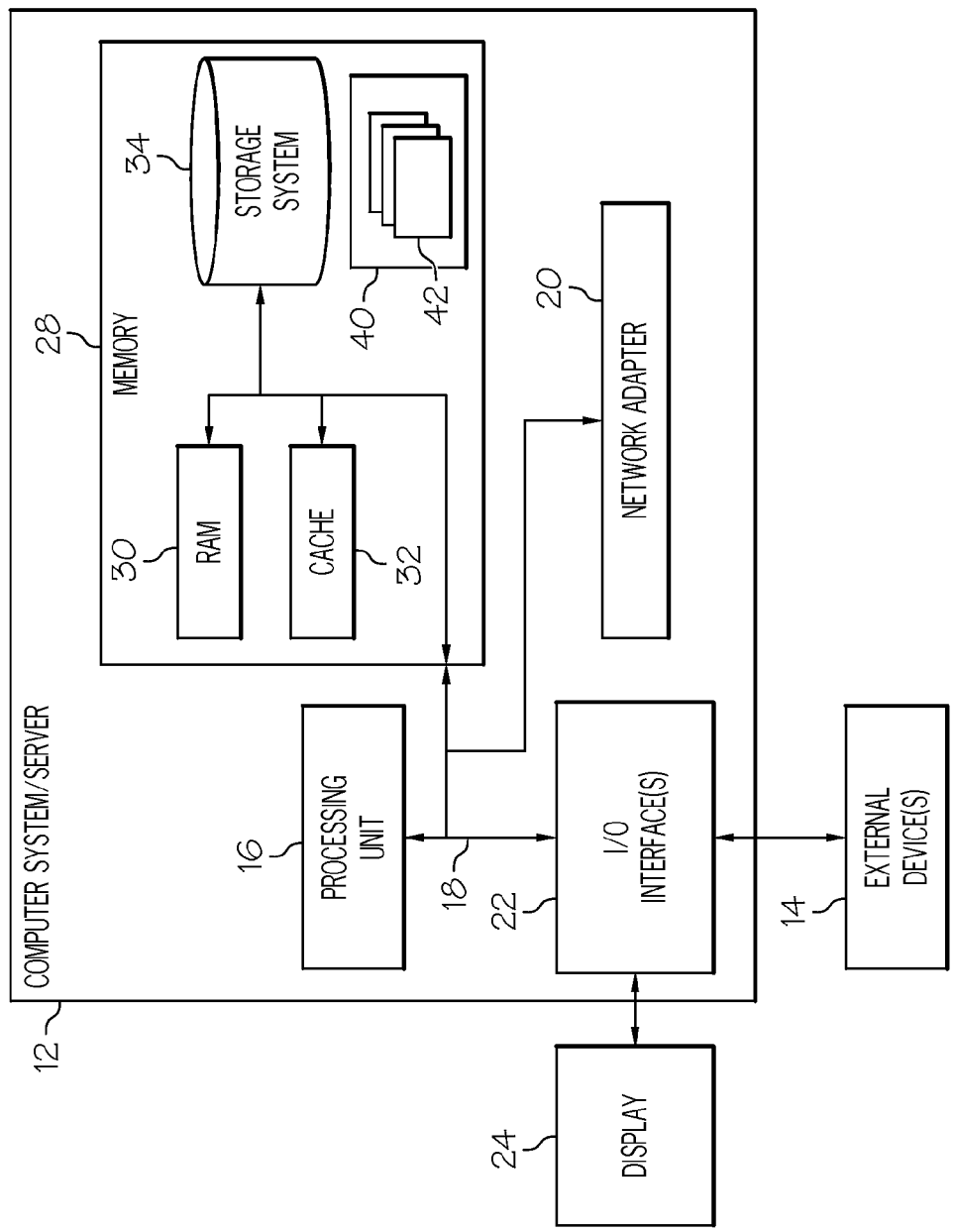
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As mentioned above, embodiments of the present invention provide a unified transportation payment system. Specifically, a passenger uses a card which has been set up for use within the transportation system to pay transportation costs. The card contains data including information representing a monetary value. The passenger uses the card at a card reader located at the transportation center. The card reader includes an application programming interface (API) which receives the data read from the card including information representing the monetary value stored on the card. The monetary value is adjusted by assessing an amount corresponding to a value associated with the transaction. The API determines a classification type of the card based on the data read from the card and maps the card data including the adjusted monetary value in accordance to a predefined format structure based on the classification. The mapped card data is then written to the card including the adjusted monetary value.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage medium including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage medium. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium. A computer readable signal medium may be any computer readable medium that is not a computer readable storage medium and that can communicate or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Transmission routing program/utility 40, having a set (at least one) of program modules 42, may be stored in memory 28 by way of example, and not limitation, as well as an operating system, one or more application programs, other program modules, and program data. In general, transmission routing program 40 performs the function of the present invention as described herein. For example, transmission routing program 40 may compute a transmission routing total indicating a complexity of a proposed application migration, and provide various outputs (e.g., spreadsheets, charts, etc.) Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Modern technology has made many things in life faster, easier and more convenient. When a user utilizes a public transportation system, the user must pay a fee. The user possesses a card which stores a monetary amount to pay the fee using a card reader. Whenever the user is using the public transportation and paying the fee, an automated fare collection (AFC) system deducts the transportation fee amount directly from the card. In a typical AFC system, many different card types are used. The present invention provides a unified payment system in which the transportation system is card type independent and the card reader uses an interface to communicate with the system.

Figure 2:
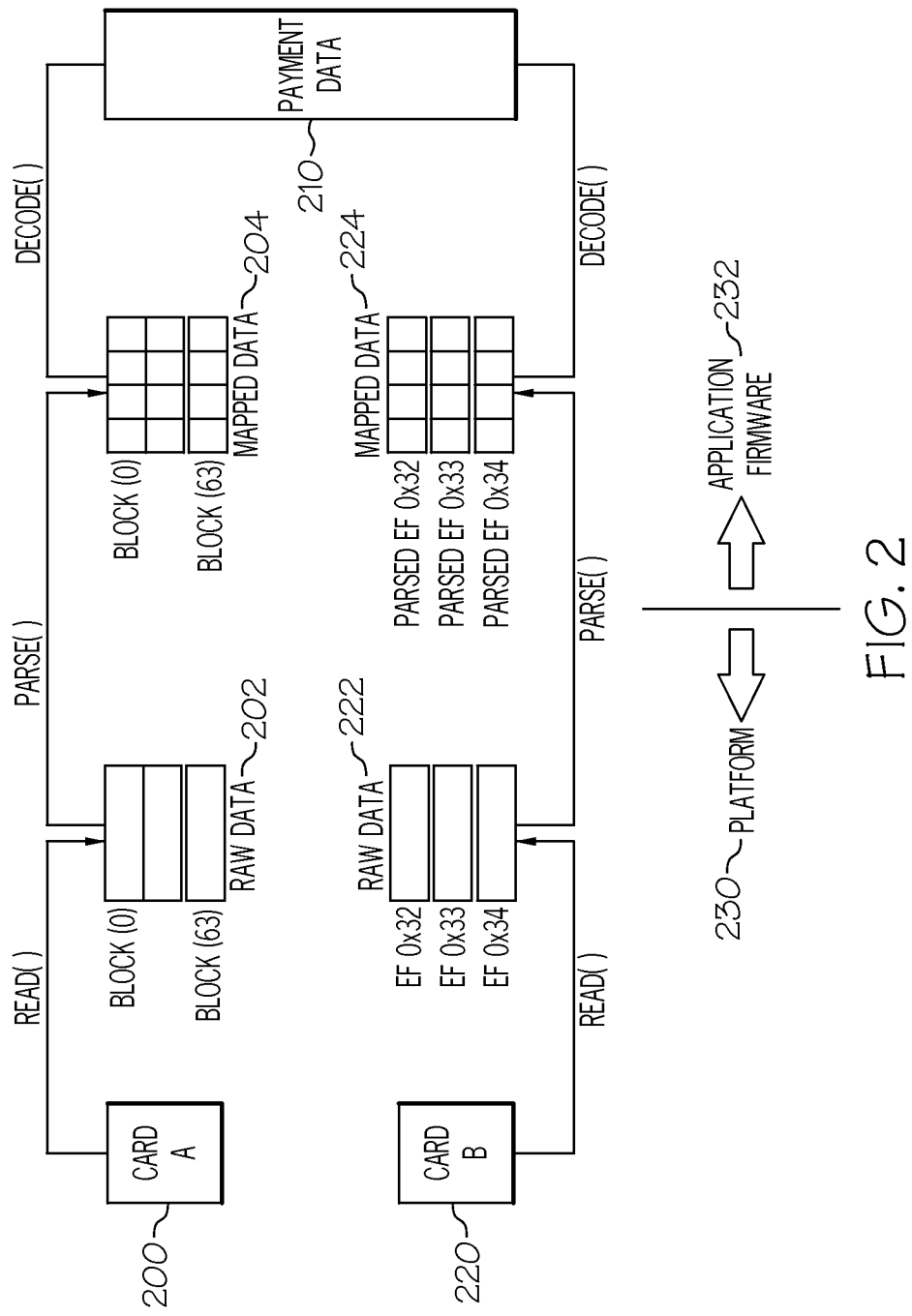
FIG. 2 depicts a graphical illustration according to an embodiment of the present invention in which data is read from the card.

FIG. 2 depicts a graphical illustration according to an embodiment of the present invention in which data is read from the card. Card A 200 and card B 220 are different types of cards, but are being used in the same AFC system (platform 230), which can be used as a card platform. Application firmware 232 controls reading the data from the card, parsing the data, decoding the data, and calculating payment data 210. Raw data 202 is read from card A 200. Raw data 222 is read from card B 220. Application firmware 232 classifies raw data 202 and raw data 222 based on the format of the data. The data size and content of raw data 202 and raw data 222 is different. The system decodes the data and converts it into the system format that platform 230 can recognize. Raw data 202 is reformatted to mapped data 204 based on the classification of raw data 202. Raw data 222 is reformatted to mapped data 224 based on the classification of raw data 222. Payment data 210 is in a format recognized by platform 230.

Figure 3:
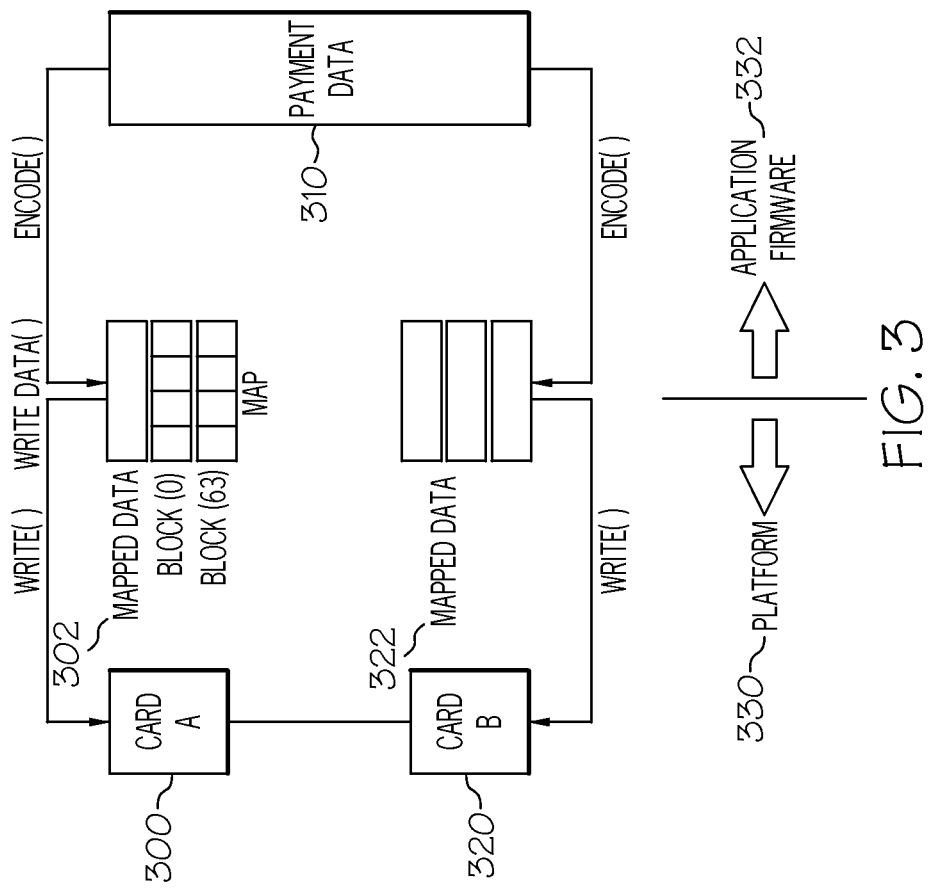
FIG. 3 depicts a graphical illustration according to an embodiment of the present invention in which data is written to the card.

FIG. 3 depicts a graphical illustration according to an embodiment of the present invention in which data is written to the card. Payment data 310 has been placed in a format recognized by platform 330. Application firmware 332 controls writing payment data 310 to card A 300 and card B 320. These are separate transactions. Payment data 310 for card A 300 is encoded and reformatted and encoded to mapped data 302. Payment data 310 for card B 320 is reformatted and encoded to mapped data 322. Payment data 310 must be placed in a format recognized by the respective card. The data is written to the respective card.

Figure 4:
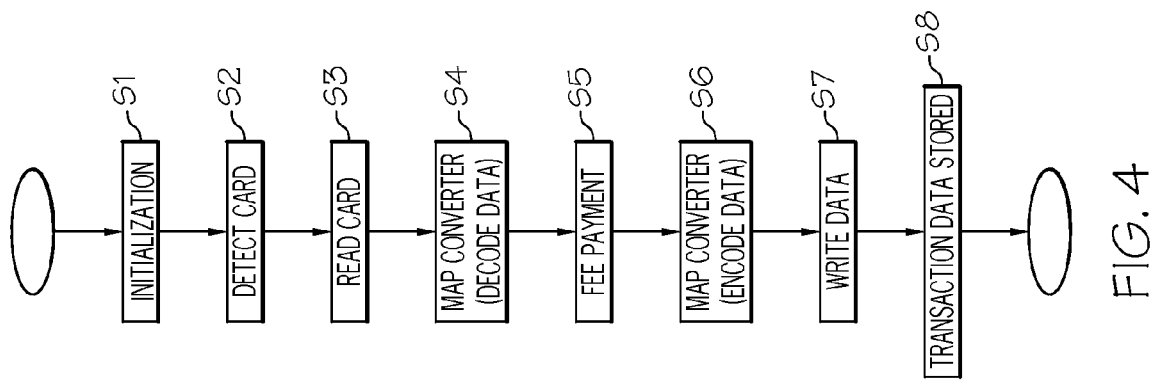
FIG. 4 depicts a method flow diagram according to the present invention.

FIG. 4 depicts a method flow diagram according to the present invention. In S1, the system is initialized. In S2, the card is detected by the card reader. In S3, data is read from the card by the card reader. In S4, the data from the card is decoded and mapped to a format recognized by the AFC system. In S5, payment is made. In S6, transaction data including payment information is encoded and put in a format recognized by the card. In S7 and S8, the transaction data is written to the card and stored.

While shown and described herein as a unified transportation payment solution, it is understood that the invention further provides various alternative embodiments. For example, in one embodiment, the invention provides a computer-readable/useable medium that includes computer program code to enable a computer infrastructure to provide financial transaction record generation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a computer-implemented method for processing a transportation payment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A transportation payment system, the system comprising:
   a card for storing data including information representing a monetary value; and
   an accepting device having a card reader, wherein the accepting device includes at least one computer in operative connection with the card reader, wherein the at least one computer is configured to access a card reader interface application, wherein the card reader interface application is configured to:
   read card data stored on the card including information representing the monetary value stored on the card;
   determine a format classification based on a format of the card data; and
   generate mapped data by decoding the card data based on the format classification, wherein the mapped data is recognizable by the card reader.

2. The transportation payment system of claim 1, wherein the card reader interface application is further configured to cause the card reader to:
   receive payment data including a monetary amount associated with a transportation cost;
   encode the payment data based on a format recognizable by the card; and
   write the encoded payment data to the card.

3. The transportation payment system of claim 2, wherein the card reader interface application is further configured to cause the card reader to adjust the monetary value on the card based on the encoded transaction data.

4. The transportation payment system of claim 2, wherein the card reader interface application is further configured is wirelessly write the encoded payment data to the card.

5. The transportation payment system of claim 1, wherein the at least one computer is further configured to receive the mapped card data.

6. The transportation payment system of claim 1, wherein the card reader interface application is further configured to wirelessly read card data stored on the card.

7. The transportation payment system of claim 1, the transportation payment system comprising a card-based platform.

8. A method for processing a payment transaction in a transportation system, comprising:
   storing data including information representing a monetary value on a card;
   reading card data stored on the card including information representing the monetary value stored on the card;
   determining a format classification based on a format of the card; and
   generating mapped data by decoding the card data based on the format classification, wherein the mapped data is recognizable by the card reader.

9. The method of claim 8, further comprising:
   receiving payment data including a monetary amount associated with a transportation cost;
   encoding the payment data based on a format recognizable by the card; and
   writing the encoded payment data to the card.

10. The method of claim 9, further comprising adjusting the monetary value on the card based on the encoded payment data.

11. The method of claim 9, further comprising wirelessly writing the encoded payment data to the card.

12. The method of claim 8, further comprising wirelessly reading the card data stored on the card.

13. A method for deploying a transportation payment system, comprising:
   providing a card for storing data including information representing a monetary value; and
   providing an accepting device having a card reader, wherein the accepting device includes at least one computer in operative connection with the card reader, wherein the at least one computer is configured to access a card reader interface application, wherein the card reader interface application is configured to control operation of the card reader to carry out a transaction, wherein the card reader interface application is configured to cause the card reader to:
   read card data stored on the card including information representing the monetary value stored on the card;
   determine a format classification based on a format of the card data; and
   generate mapped data by decoding the card data based on the format classification, wherein the mapped data is recognizable by the card reader.

14. The method of claim 13, wherein the card reader interface application is further configured to decode any encoded card data stored on the card.

15. The method of claim 13, wherein the card reader interface application is further configured to:
   receive payment data including a monetary amount associated with a transportation cost;
   encode the payment data based on a format recognizable by the card; and
   write the encoded payment data to the card.

16. The method of claim 15, wherein the card reader interface application is further configured to wirelessly write the encoded payment data to the card.

17. The method of claim 13, wherein the card reader is configured to wirelessly read the card data stored on the card.

18. A computer program product for processing a payment transaction in a transportation system, the computer program product comprising a non-transitory computer readable storage medium, and program instructions stored on the non-transitory computer readable storage medium, to:
   store data including information representing a monetary value on a card;
   read card data stored on the card including information representing the monetary value stored on the card;
   determine a format classification based on a format of the card data; and
   generate mapped data by decoding the card data based on the format classification, wherein the mapped data is recognizable by the card reader.

19. The computer program product of claim 18, further comprising program instructions to decode any encoded card data stored on the card.

20. The computer program product of claim 18, further comprising program instructions to:
   receive payment data including a monetary amount associated with a transportation cost;
   encode the payment data based on a format recognizable by the card; and
   write the encoded payment data to the card.

21. The computer program product of claim 18, further comprising program instructions to wirelessly read the card data stored on the card.

22. The computer program product of claim 18, further comprising program instructions to wirelessly write the encoded payment data to the card.

* * * * *